Figure 1:
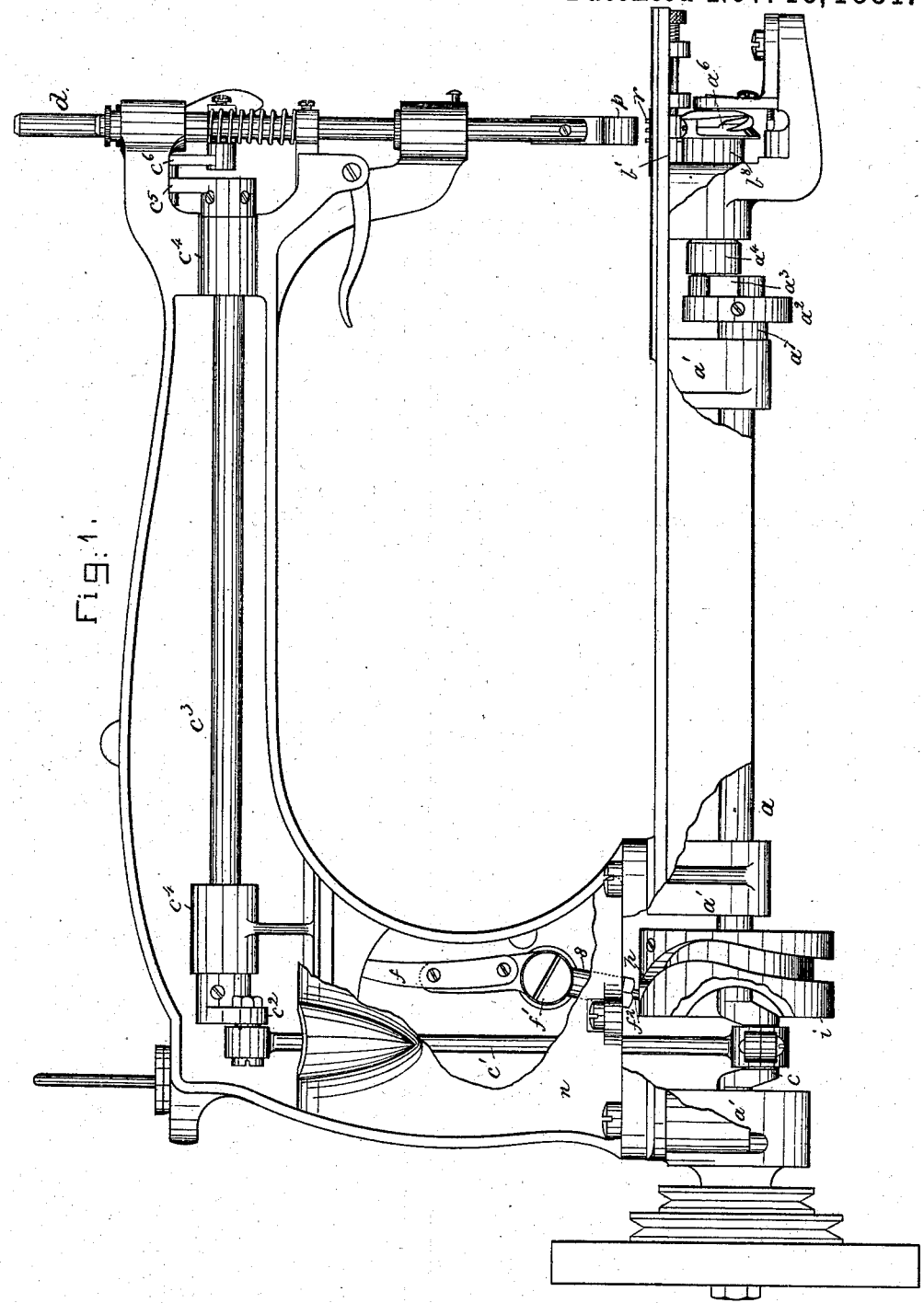

(Model.)
A. STEWARD & G. H. DIMOND.
SEWING MACHINE.
No. 249,554. Patented Nov. 15, 1881.
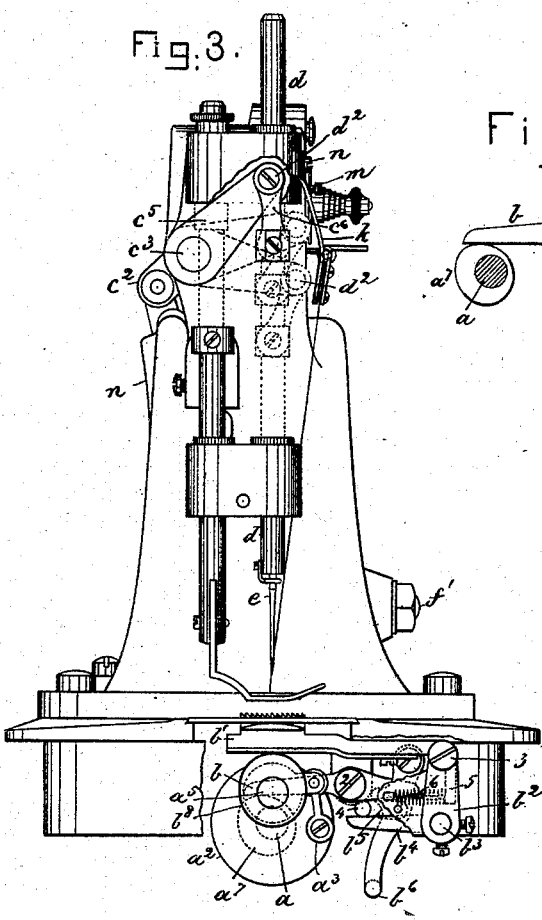
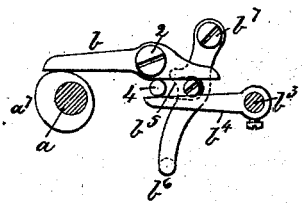
Fig. 3.
Fig. 7.
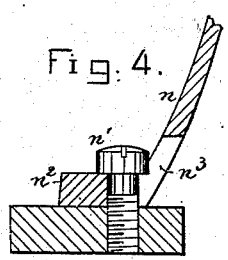
Fig. 4.
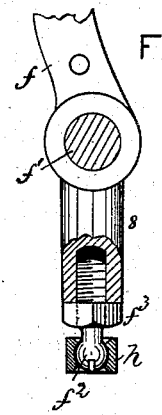
Fig. 5.
Fig. 6.
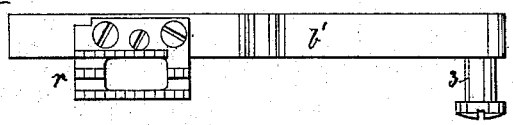
Fig. 8.
Witnesses
John F C Prescott
B. J. Noyes
Inventors.
Aurelius Steward
and
George H. Dimond
by Crosby & Gregory
Attys
N. PETERS, Photo-Lithographer, Washington, D. C.

UNITED STATES PATENT OFFICE.

AURELIUS STEWARD AND GEORGE H. DIMOND, OF BRIDGEPORT, CONNECTICUT, ASSIGNORS TO WHEELER & WILSON MANUFACTURING COMPANY, OF SAME PLACE.

SEWING-MACHINE.

SPECIFICATION forming part of Letters Patent No. 249,554, dated November 15, 1881.

Application filed July 9, 1881. (Model.)

*To all whom it may concern:*

Be it known that we, AURELIUS STEWARD and GEORGE H. DIMOND, both of Bridgeport, Fairfield county, State of Connecticut, have invented an Improvement in Sewing-Machines, of which the following description, in connection with the accompanying drawings, is a specification.

This invention relates to sewing-machines, and is an improvement on the Wheeler & Wilson class of sewing-machine employing a rotating hook.

Our invention consists in a four-motioned feeding device having an overhanging toothed portion and fixed fulcrum projecting laterally from but one side thereof in the same direction as the said overhanging portion, combined with an arm of a rock-shaft which receives the said stud, the thickness of the said arm and the length of the said fulcrum being sufficient to firmly support the rear end of the feed-bar by the fulcrum extended only from one side, and prevent the bar from twisting or turning, substantially as described; also, in a feeding device having a short arm, an overhanging toothed portion, and a fixed fulcrum projecting laterally from but one side thereof in the same direction as the said overhanging portion, combined with an arm of a rock-shaft which receives the said stud, and with a spring to depress the feed-bar, substantially as described; also, in a rocking shaft and its single arm to support and direct the feed, combined with a feeding device having overhanging feed-points, and a fulcrum fixed to the said bar and extended laterally from the side of the said bar into a bearing in the said single arm in the direction of the overhanging feed-points to a point as remote from the center of the feed-bar as the slot in the feed-bar through which the needle descends, the said stud or fulcrum serving to keep the same and the feed-bar and its feed-points from being turned partially over, substantially as described; also, in a rock-shaft having two arms and a feeding device provided with a fulcrum extended into and supported and carried by one of the said arms of the said rock-shaft, combined with a lever of the first order, a cam to operate the said lever, and an adjustable pin intermediate the said lever, and another arm of the said rock-shaft to control the extent of the feed movement or length of stitch, substantially as described; also, in a hook and hook-shaft, a rotating shaft and link to rotate the hook-shaft, and a needle-operating rock-shaft provided with oppositely-placed cranks, as described, combined with a connecting-rod, and with a needle-bar and link operated from the said rock-shaft, substantially as described.

Figure 2:
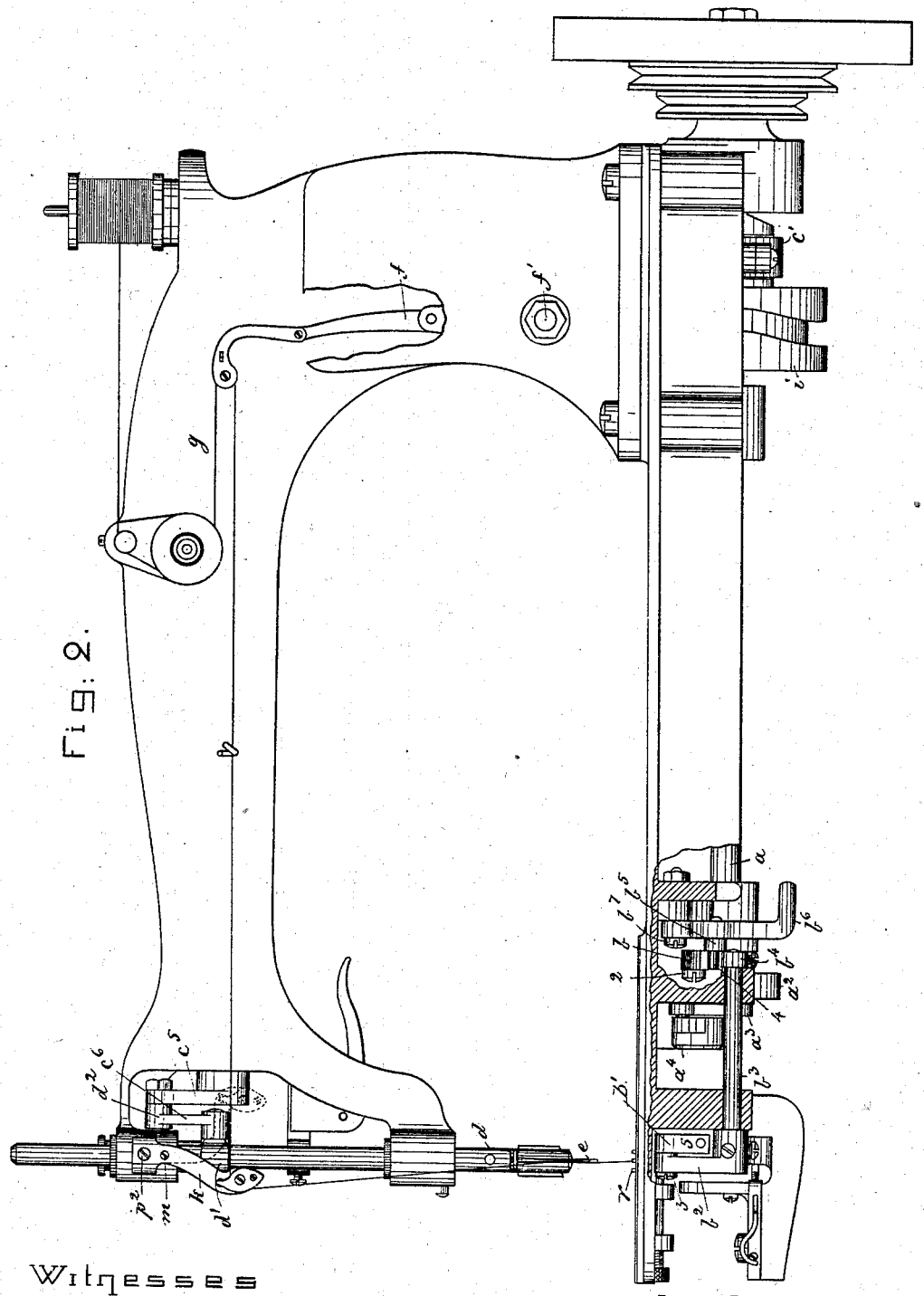

Figure 1 represents a rear side elevation of a sewing-machine containing our improvements, a part of the frame-work being broken out to better illustrate the construction of the parts; Fig. 2, a front side elevation thereof, a portion of the frame-work being broken out to better illustrate the feeding and take-up devices, the rotating hook being omitted. Fig. 3 is a front-end view of Fig. 2, a part of the frame-work being broken out to show the feeding mechanism. Fig. 4 is a detail of the lower end of the arm-cap. Fig. 5 is a detail of the lower part of the take-up and its supporting-shaft. Fig. 6 is a detail of the cam-slide used with the globular-headed stud of the take-up. Fig. 7 is a detail of the stitch-regulating devices of the feeding mechanism. Fig. 8 is a top view of the feeding device removed from the machine.

The frame-work of the machine is of usual shape.

The main driving-shaft $a$, supported on bearings $a'$, has at its front end a disk provided with a crank-pin, thus constituting a crank, $a^2$, which is joined by link $a^3$ with the crank $a^4$ on the rotating hook-shaft, having at its end the usual hook, $a^6$, all as common in the Wheeler & Wilson machines. The shaft $a$ has upon it, at the rear of crank $a^2$, a cam, $a^7$, which acts upon a lever, $b$, having its pivot at 2, and moves the said lever a uniform distance at each rotation of the shaft $a$. The lever $b$ is that which imparts forward movement to the feeding device $b'$ through the intervention of mechanism which will now be described.

The rear end of the feeding device $b'$ has fixed to it a stud, 3, which is extended therefrom laterally, and takes a bearing in the arm $b^2$ of the rock-shaft $b^3$, having at its opposite end a second arm, $b^4$, at right angles to the arm $b^2$, the arm $b^4$ being extended toward the shaft $a$ immediately below the outer end of the lever $b$. A pin or stud, 4, of a link, $b^5$, pivoted at its rear end to a stitch-regulating lever, $b^6$, having its fulcrum at $b^7$, is interposed between the lever $b$ and arm $b^4$, as shown in Figs. 3 and 7, and the said pin is made adjustable as to its position with relation to the fulcrum 2 of the lever $b$ and the center line of the rock-shaft $b^3$, thus enabling us, by adjustment of the said pin, to cause the lever $b$, the stroke of which is uniform, as stated, to impart more or less rocking motion to the rock-shaft $b^3$, and consequently a greater or less stroke to the feed, and to thereby control the length of the stitch, the feed being longer the nearer the pin 4 is brought toward the outer end of the lever $b$, and vice versa. To retain this lever in adjusted position a spring-washer is interposed between the lever and the screw-head of the fulcrum $b^7$. The short arm 5 of the feeding device $b'$ is acted upon by a spring, 6, attached to a fixed lug, as shown in Fig. 3, the said spring serving the double purpose of moving the arm $b^2$ of the rock-shaft $b^3$ in such direction as to constantly keep its arm $b^4$ pressed upward against the pin 4, and the latter against the outer end of the lever $b$, and consequently the inner end of said lever down upon the cam $a^7$, and also of keeping the under side of the feeding device $b'$ down in contact with the lifting-cam $b^8$. The shaft $a$ also has on it a crank, $c$, which is embraced by the lower end of the connecting-rod $c'$, joined at its upper end with the crank $c^2$ of the rocker-shaft $c^3$, held in bearings $c^4$, the said rocker-shaft having at its outer end a crank, $c^5$, which imparts movement to the needle-bar $d$ and needle $e$ through the link $c^6$. This rocker-shaft $c^3$, for imparting movement to the needle-bar, is arranged with the arms or cranks $c^2 c^3$ of the said shaft projecting therefrom in substantially diametrically opposite directions, whereby we are enabled to move the needle-bar and the connecting-rod $c'$ in opposite directions, thus counterbalancing the weight of the connections of the said shaft $c^3$ and the needle-bar, and lessening the effect of momentum, and consequently the shock resulting therefrom, as would be the effect if both cranks extended from the same side of the shaft in the same direction, and the movement of the needle-bar and connecting-rod joined with the said cranks were simultaneously in the same direction.

By counterbalancing the shaft $c^3$, as described, we make its movements easier, and are enabled to greatly increase the speed of the machine without increase of noise and jar.

The end of the crank $c^5$, which operates the needle-bar, is joined by link $c^6$ with the stud of collar $d'$, secured to the said needle-bar. The length of the crank $c^5$, and its position on the rock-shaft $c^3$ moved from shaft $a$, and its arrangement with relation to the needle-bar, are such that as the crank starts downward from its highest point or full-line position, Fig. 3, part of the effect of the crank movement on the needle-bar is lost by reason of the relative position of the crank, its pin $d^2$, and link, the pin $d^2$, in its highest position, passing across the needle-bar, which retards the first part of the descent of the needle-bar; but as soon as the said pin reaches a position substantially in the same horizontal line with the rock-shaft $c^3$ the speed of the descent of the needle-bar is rapidly increased by the approach of the pin $d^2$ toward the needle-bar, thus causing the needle to descend quickly after puncturing the fabric, thus delivering its thread to the hook as quickly as possible, and as the needle-bar rises the first part of its movement is fast and the latter part of its upward movement is slow, or materially retarded by the passage of the pin $d^2$ back across the needle-bar, to thus give time for the take-up to act in drawing up the thread and finishing the stitch. This arrangement of the link and cranks in connection with a rock-shaft enables us to operate the needle-bar by means of a crank or eccentric, and yet secure such irregular motion of the needle-bar as to adapt it to the requirements of the usual rotating hook in the best possible manner.

Instead of the crank $c$ on the shaft $a$, we desire it to be understood that we may obtain the same effect by the employment of an eccentric.

The take-up lever $f$, having at its upper end a roller to receive about it the needle-thread $g$, has its fulcrum on the stud $f'$, and at its lower end the lever $f$ has adjustably screwed into it a globular or spherical headed stud, $f^2$, held in adjusted position by a set-nut, $f^3$. The spherical portion of the stud receives upon it the cam-slide $h$, (shown separately in Fig. 6,) which cam-slide, in slightly different form and position, is now in common use, the cam-slide being in this case fitted into the groove of the cam $i$, directly above the center of the said cam and the shaft $a$, instead of at the side, as formerly employed, which enables the take-up lever to be shortened, thereby reducing its weight and liability to undue vibration.

To enable us to employ the cam-slide in this new position with the shortened lever $f$, the central opening in the said slide had to be enlarged to make room for the neck of the stud $f^2$.

The particular function or construction of the upper part of the take-up lever is not herein shown, nor is it herein claimed; but it will form the subject-matter of another application.

The needle-thread $g$, between the take-up and the needle, is usually passed over a roller of a bracket or thread-guide, (shown in Fig. 2,) and the needle-thread is led therefrom down the side of and into the eye of the needle.

The guide $k$, secured in place by screw $p^2$, is made adjustable horizontally toward and from the needle-bar and the operator by a screw, $m$. The longer the stitch the nearer the operator the bracket and roller are placed.

The arm-cap $n$, a partial section of which is shown in Fig. 4, is held in place by a screw, $n'$. Ordinarily, to remove the cap, it has been necessary to first remove the screw from the machine; but to obviate this and permit the cap to be removed simply by loosening the screw $n'$, we have slotted the flanged part $n^2$ of the cap $n$, and made an aperture, $n^3$, through the side of the cap next the slot in the base, the said aperture being large enough to permit the cap to be moved past the head of the screw $n'$ and away from and so as to uncover the upright arm of the machine when the screw $n'$ is slightly loosened.

The fulcrum 3 for the feeding device $b'$ is fixed to and projects from the feeding device in the direction of the overhanging feed portion $r$, (see Fig. 8,) thereby preventing the said portion $r$ from being depressed at one more than at its other edge or side by the action of the presser-foot $p$ upon the material above the feeding device, supporting the rear end of the feeding-bar, as described, by the pin 3 in arm $b^2$, so that it cannot tip at its front end, $r$, but simply rises and falls in a vertical plane, enabling us to do away with all other guides and supports for holding the feed-bar in position at the rear end.

We claim—

1. The feeding device $b'$, overhanging toothed portion $r$, and fixed fulcrum 3, projecting laterally from but one side thereof in the same direction as the said overhanging portion, combined with the arm $b^2$ of the rock-shaft, which receives the said stud, the thickness of the said arm and the length of the said fulcrum being sufficient to firmly support the rear end of the feed-bar by the fulcrum extended only from one side, and prevent the bar from twisting or turning, substantially as described.

2. The feeding device $b'$, having the short arm 5, overhanging toothed portion $r$, and fixed fulcrum 3, projecting laterally from but one side thereof in the same direction as the said overhanging portion, combined with the arm $b^2$ of the rock-shaft, which receives the said stud, and with the spring to depress the feed-bar, substantially as described.

3. The rocking shaft $b^3$ and its single arm $b^2$, to support and direct the feed, combined with the feeding device having the overhanging feed-points $r$, and the fulcrum 3, fixed to the said bar and extended laterally from the side of the said bar into a bearing in the single arm $b^2$ in the direction of the overhanging feed-points $r$, and to a point as remote from the center of the feed-bar as the slot in the feed-bar through which the needle descends, the said stud or fulcrum serving to keep the feed-bar and its portion $r$ from being turned partially over, substantially as described.

4. The rock-shaft having two arms, $b^2$ $b^4$, and the feeding device provided with fulcrum 3, extended into and supported and carried by the arm $b^2$ of the said rock-shaft, combined with the lever $b$, of the first order, a cam to operate the said lever, and the adjustable pin 4, intermediate the said lever and arm $b^4$ of the rock shaft, to control the extent of the feed movement or length of stitch, substantially as described.

5. The hook and hook-shaft, the rotating shaft $a$ and link to rotate the hook-shaft, and the needle-operating rock-shaft provided with oppositely-placed cranks, as described, combined with the connecting-rod $c'$, and with the needle-bar and link $c^6$, operated from the said rock-shaft, substantially as described.

In testimony whereof we have signed our names to this specification in the presence of two subscribing witnesses.

AURELIUS STEWARD.
GEORGE H. DIMOND.

Witnesses:
ISAAC HOLDEN,
LOUIS H. BAKER.